United States Patent
Lee et al.

(10) Patent No.: US 11,963,053 B2
(45) Date of Patent: Apr. 16, 2024

(54) CONDITIONAL HANDOVER WITH MULTIPLE SUBSCRIPTIONS

(71) Applicant: QUALCOMM Incorporated, San Diego, CA (US)

(72) Inventors: Kuo-Chun Lee, San Diego, CA (US); Qingxin Chen, San Diego, CA (US); Arvind Vardarajan Santhanam, San Diego, CA (US); Reza Shahidi, San Diego, CA (US); Mouaffac Ambriss, San Diego, CA (US); Liangchi Hsu, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/651,674

(22) Filed: Feb. 18, 2022

(65) Prior Publication Data

US 2023/0269636 A1    Aug. 24, 2023

(51) Int. Cl.
*H04W 36/00* (2009.01)
*H04W 36/02* (2009.01)
*H04W 36/30* (2009.01)
*H04W 76/19* (2018.01)

(52) U.S. Cl.
CPC .   *H04W 36/00837* (2018.08); *H04W 36/0058* (2018.08); *H04W 36/0069* (2018.08); *H04W 36/02* (2013.01); *H04W 36/305* (2018.08); *H04W 76/19* (2018.02)

(58) Field of Classification Search
None
See application file for complete search history.

(56) References Cited

U.S. PATENT DOCUMENTS

| | | | |
|---|---|---|---|
| 2015/0264602 A1* | 9/2015 | Hageltorn | H04W 36/20 455/436 |
| 2015/0334574 A1* | 11/2015 | Krishnamoorthy | H04W 72/0453 370/329 |
| 2022/0322164 A1* | 10/2022 | Vyas | H04W 8/20 |

(Continued)

FOREIGN PATENT DOCUMENTS

| | | | |
|---|---|---|---|
| EP | 2919542 A1 | 9/2015 | |
| WO | WO-2018175721 A1 * | 9/2018 | H04W 24/08 |
| WO | WO-2021081959 A1 | 5/2021 | |

OTHER PUBLICATIONS

International Search Report and Written Opinion—PCT/US2023/062130—ISA/EPO—dated May 9, 2023.

*Primary Examiner* — Kenny S Lin
(74) *Attorney, Agent, or Firm* — Harrity & Harrity, LLP

(57) ABSTRACT

Various aspects of the present disclosure generally relate to wireless communication. In some aspects, a user equipment (UE) may determine, via a first subscription of the UE, a trigger event for a conditional handover of the UE from a source network entity to a target network entity. The UE may determine, based at least in part on the trigger event, that a target band associated with the target network entity is not compatible with a serving band associated with a second subscription of the UE. The UE may store the trigger event for the conditional handover in a buffer of the UE. The UE may perform an action related to the conditional handover based at least in part on a condition being satisfied. Numerous other aspects are described.

30 Claims, 14 Drawing Sheets

(56) References Cited

U.S. PATENT DOCUMENTS

2023/0010736 A1* 1/2023 Hebein ................ H04W 24/10
2023/0014227 A1* 1/2023 Kumar ................. H04W 76/28

* cited by examiner

CONDITIONAL HANDOVER WITH MULTIPLE SUBSCRIPTIONS

FIELD OF THE DISCLOSURE

Aspects of the present disclosure generally relate to wireless communication and to techniques and apparatuses for conditional handover with multiple subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: determine, via a first subscription of the UE, a trigger event for a conditional handover of the UE from a source network entity to a target network entity based at least in part on trigger event criteria being satisfied; determine, based at least in part on the trigger event, that a target band associated with the target network entity is not compatible with a serving band associated with a second subscription of the UE; store the trigger event for the conditional handover in a buffer of the UE based at least in part on the target band associated with the target network entity not being compatible with the serving band associated with the second subscription; and perform an action related to the conditional handover based at least in part on a condition being satisfied.

In some implementations, an apparatus for wireless communication at a UE includes a memory and one or more processors, coupled to the memory, configured to: determine, via a first subscription of the UE, a trigger event for a conditional handover of the UE from a source network entity to a target network entity based at least in part on trigger event criteria being satisfied; determine that a target band associated with the target network entity is compatible with a serving band associated with a second subscription of the UE; and perform, via the first subscription, the conditional handover to establish a connection between the UE and the target network entity and to terminate a connection between the UE and the source network entity.

In some implementations, a method of wireless communication performed by a UE includes determining, via a first subscription of the UE, a trigger event for a conditional handover of the UE from a source network entity to a target network entity based at least in part on trigger event criteria being satisfied; determining, based at least in part on the trigger event, that a target band associated with the target network entity is not compatible with a serving band associated with a second subscription of the UE; storing the trigger event for the conditional handover in a buffer of the UE based at least in part on the target band associated with the target network entity not being compatible with the serving band associated with the second subscription; and performing an action related to the conditional handover based at least in part on a condition being satisfied.

In some implementations, a method of wireless communication performed by a UE includes determining, via a first subscription of the UE, a trigger event for a conditional handover of the UE from a source network entity to a target network entity based at least in part on trigger event criteria being satisfied; determining that a target band associated with the target network entity is compatible with a serving band associated with a second subscription of the UE; and performing, via the first subscription, the conditional handover to establish a connection between the UE and the target network entity and to terminate a connection between the UE and the source network entity.

In some implementations, a non-transitory computer-readable medium storing a set of instructions for wireless communication includes one or more instructions that, when executed by one or more processors of a UE, cause the UE to: determine, via a first subscription of the UE, a trigger event for a conditional handover of the UE from a source network entity to a target network entity based at least in part on trigger event criteria being satisfied; determine, based at least in part on the trigger event, that a target band associated with the target network entity is not compatible with a serving band associated with a second subscription of the UE; store the trigger event for the conditional handover in a buffer of the UE based at least in part on the target band associated with the target network entity not being compatible with the serving band associated with the second subscription; and perform an action related to the conditional handover based at least in part on a condition being satisfied.

In some implementations, a non-transitory computer-readable medium storing a set of instructions for wireless communication includes one or more instructions that, when executed by one or more processors of a UE, cause the UE to: determine, via a first subscription of the UE, a trigger event for a conditional handover of the UE from a source network entity to a target network entity based at least in part on trigger event criteria being satisfied; determine that a target band associated with the target network entity is compatible with a serving band associated with a second subscription of the UE; and perform, via the first subscription, the conditional handover to establish a connection between the UE and the target network entity and to terminate a connection between the UE and the source network entity.

In some implementations, an apparatus for wireless communication includes means for determining, via a first subscription of the apparatus, a trigger event for a conditional handover of the apparatus from a source network entity to a target network entity based at least in part on trigger event criteria being satisfied; means for determining, based at least in part on the trigger event, that a target band associated with the target network entity is not compatible with a serving band associated with a second subscription of the apparatus; means for storing the trigger event for the conditional handover in a buffer of the apparatus based at least in part on the target band associated with the target network entity not being compatible with the serving band associated with the second subscription; and means for performing an action related to the conditional handover based at least in part on a condition being satisfied.

In some implementations, an apparatus for wireless communication includes means for determining, via a first subscription of the apparatus, a trigger event for a conditional handover of the apparatus from a source network entity to a target network entity based at least in part on trigger event criteria being satisfied; means for determining that a target band associated with the target network entity is compatible with a serving band associated with a second subscription of the apparatus; and means for performing, via the first subscription, the conditional handover to establish a connection between the apparatus and the target network entity and to terminate a connection between the apparatus and the source network entity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
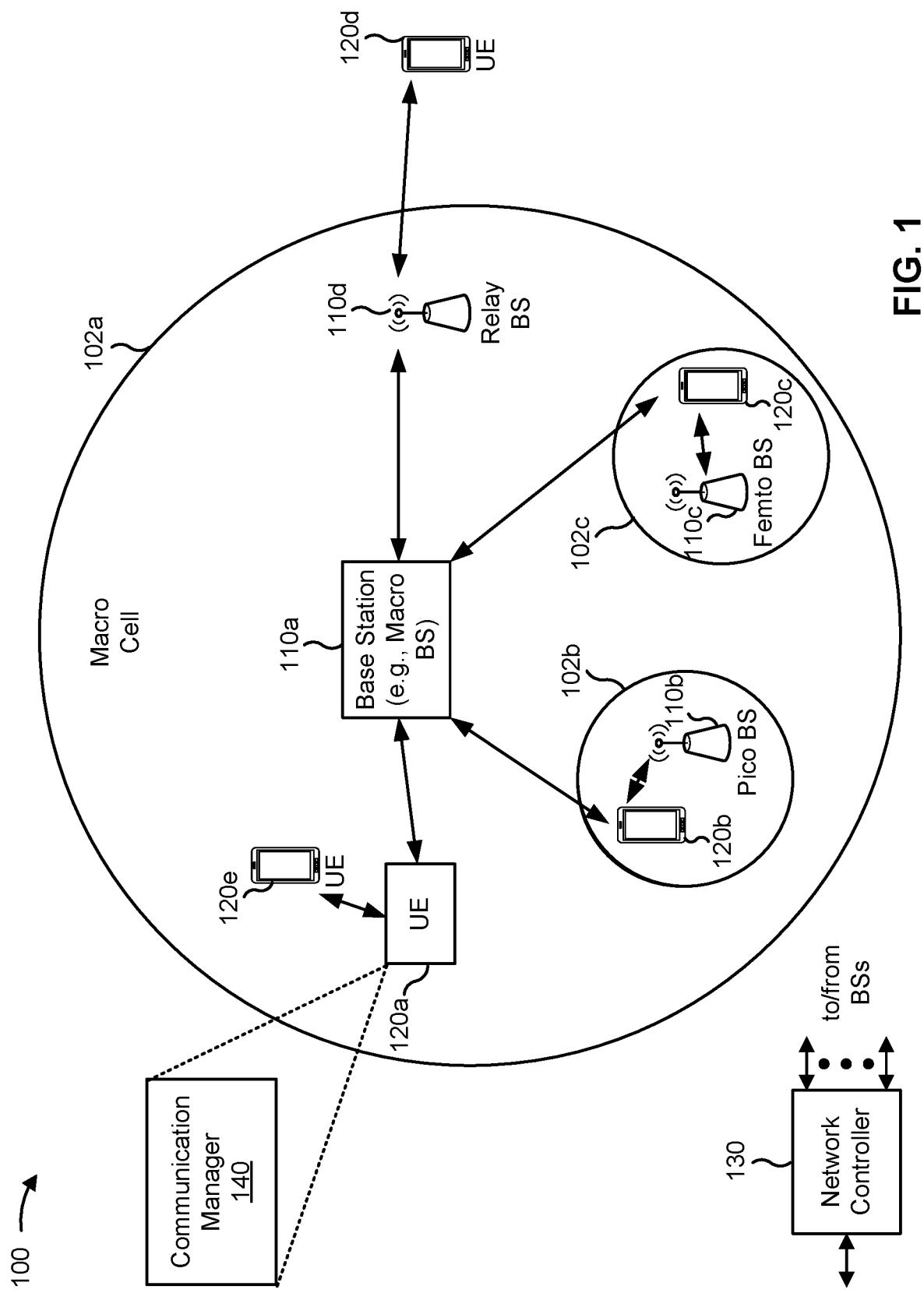
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may determine, via a first subscription of the UE, a trigger event for a conditional handover of the UE from a source network entity to a target network entity based at least in part on trigger event criteria being satisfied; determine, based at least in part on the trigger event, that a target band associated with the target network entity is not compatible with a serving band associated with a second subscription of the UE; store the trigger event for the conditional handover in a buffer of the UE based at least in part on the target band associated with the target network entity not being compatible with the serving band associated with the second subscription; and perform an action related to the conditional handover based at least in part on a condition being satisfied. Additionally, or alternatively, the communication manager 140 may perform one or more other operations described herein.

In some aspects, a UE (e.g., UE 120) may include a communication manager 140. As described in more detail elsewhere herein, the communication manager 140 may determine, via a first subscription of the UE, a trigger event for a conditional handover of the UE from a source network entity to a target network entity based at least in part on trigger event criteria being satisfied; determine that a target band associated with the target network entity is compatible with a serving band associated with a second subscription of the UE; and perform, via the first subscription, the conditional handover to establish a connection between the UE and the target network entity and to terminate a connection between the UE and the source network entity. Additionally, or alternatively, the communication manager 140 may perform one or more other operations described herein.

As indicated above, FIG. 1 is provided as an example. Other examples may differ from what is described with regard to FIG. 1.

Figure 2:
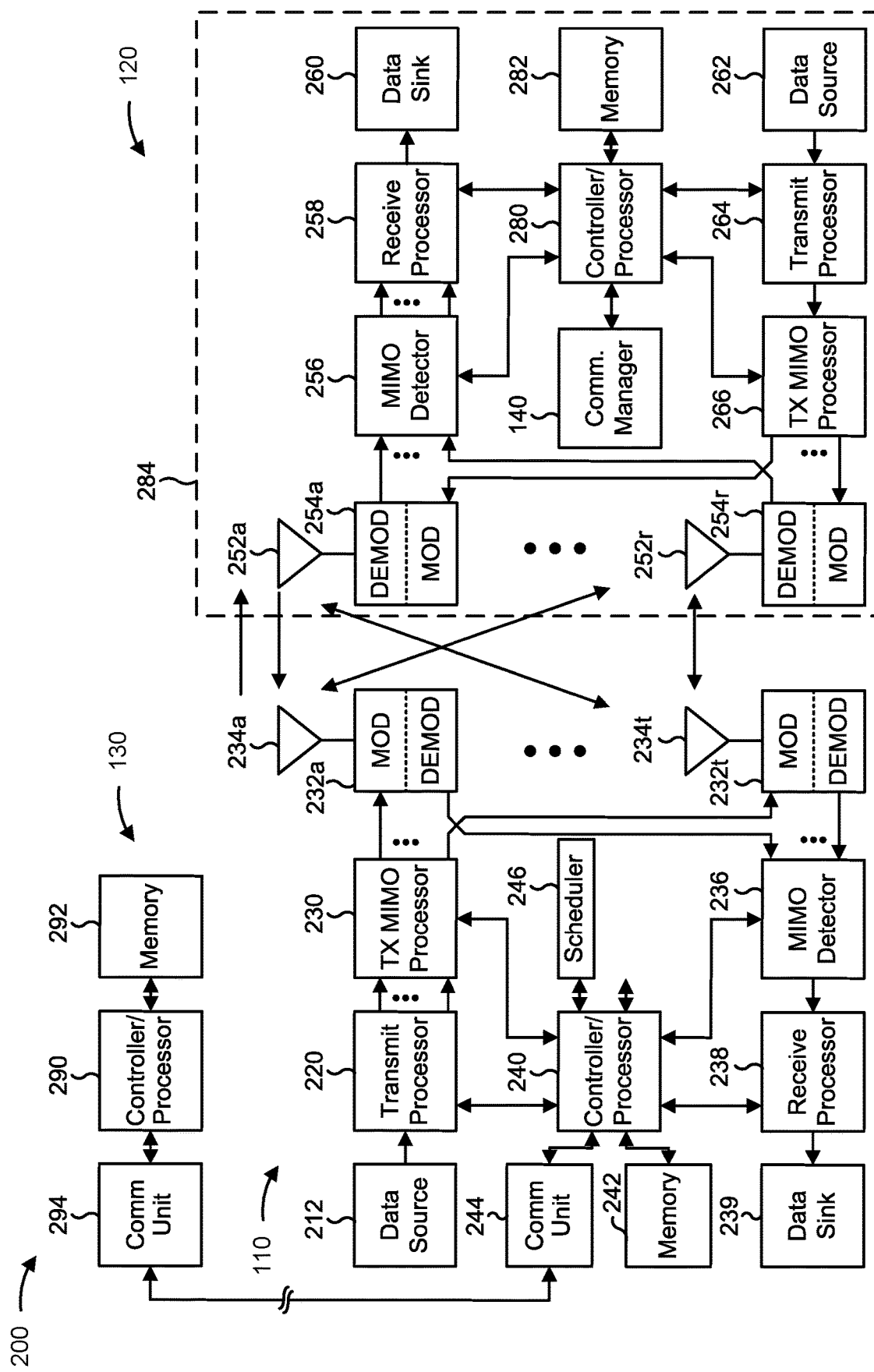
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with conditional handover with multiple subscriptions, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for determining, via a first subscription of the UE, a trigger event for a conditional handover of the UE from a source network entity to a target network entity based at least in part on trigger event criteria being satisfied; means for determining, based at least in part on the trigger event, that a target band associated with the target network entity is not compatible with a serving band associated with a second subscription of the UE; means for storing the trigger event for the conditional handover in a buffer of the UE based at least in part on the target band associated with the target network entity not being compatible with the serving band associated with the second subscription; and/or means for performing an action related to the conditional handover based at least in part on a condition being satisfied. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., UE 120) includes means for determining, via a first subscription of the UE, a trigger event for a conditional handover of the UE from a source network entity to a target network entity based at least in part on trigger event criteria being satisfied; means for determining that a target band associated with the target network entity is compatible with a serving band associated with a second subscription of the UE; and/or means for performing, via the first subscription, the conditional handover to establish a connection between the UE and the target network entity and to terminate a connection between the UE and the source network entity. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A source network entity (e.g., a source base station) may transmit, to a UE, a radio resource control (RRC) reconfiguration (RRCReconfiguration) information element (IE). The RRC reconfiguration message may define a conditional reconfiguration (conditionalReconfiguration-r16) IE, which may be a handover candidate configuration. The conditional reconfiguration IE may include a conditional reconfiguration to add or modify list (condReconfigToAddModList-r16) IE, which may include a list of measurement identifiers (IDs) (measId) including frequencies and a target physical cell identity (PCI).

The source network entity may also transmit, to the UE, a measurement configuration that includes a measurement object (measObject) parameter and a report configuration (reportConfig). The report configuration may define a conditional trigger configuration (CondTriggerConfig-r16) IE. The conditional trigger configuration may define an A3 event (condEventA3), which may occur when a measurement associated with a neighbor cell exceeds a measurement associated with a primary cell (PCell) by an offset (a3-Offset). The conditional trigger configuration may define an A5 event (condEventA5), which may occur when a measurement associated with the PCell is less than a first threshold (a5-Threshold1) and a measurement associated with the neighbor cell becomes higher than a second threshold (a5-Threshold2).

The UE may trigger a conditional handover based at least in part on the RRC reconfiguration IE, the conditional reconfiguration IE, and/or the conditional trigger configuration IE. The conditional handover may allow the UE to trigger a handover procedure without sending a measurement report to the source network entity and without receiving a handover command from the source network entity.

Figure 3:
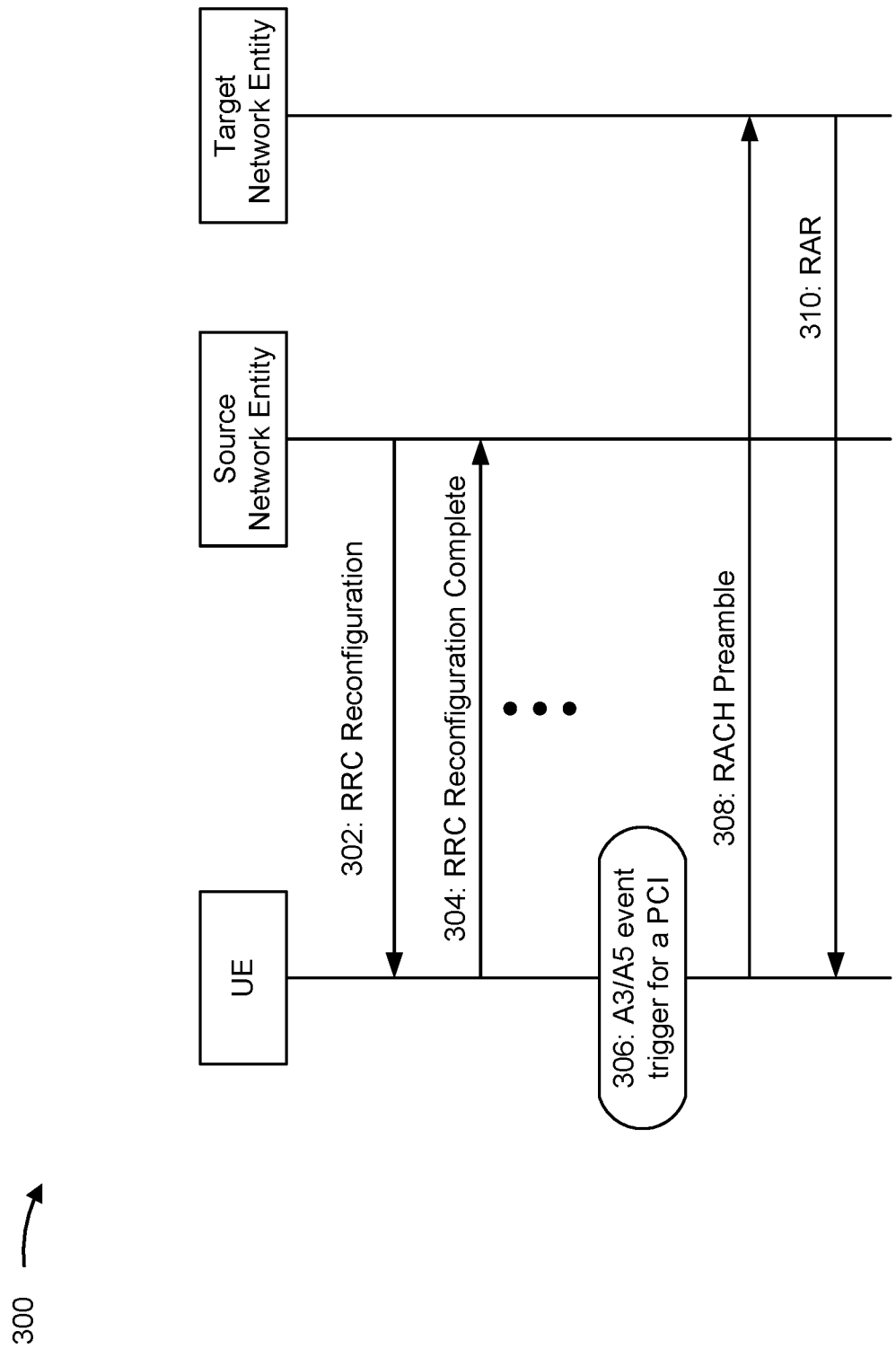
FIG. 3 is a diagram illustrating an example of a conditional handover, in accordance with the present disclosure.

FIG. 3 is a diagram illustrating an example 300 of a conditional handover, in accordance with the present disclosure.

As shown by reference number 302, a UE may receive, from a source network entity, an RRC reconfiguration IE, which may be associated with a conditional reconfiguration IE and a conditional trigger configuration IE. As shown by reference number 304, the UE may transmit, to the source network entity, an RRC reconfiguration complete IE based at least in part on the RRC reconfiguration IE. As shown by reference number 306, the UE may detect an A3/A5 trigger event for a PCI associated with a target network entity, based at least in part on the RRC reconfiguration IE, the conditional reconfiguration IE, and/or the conditional trigger configuration IE. The UE may detect an A3 trigger event based at least in part on a measurement associated with the target network entity being greater than a measurement associated with the source network entity by an offset. The UE may detect an A5 trigger event based at least in part on a measurement associated with the source network entity becoming less than a first threshold and a measurement associated with the target network entity becoming greater than a second threshold. As shown by reference number 308, the UE may transmit a random access channel (RACH) preamble to the target network entity. The UE may transmit the RACH preamble based at least in part on a conditional handover triggered at the UE. As shown by reference number 310, the UE may receive a random access response (RAR) from the target network entity.

As indicated above, FIG. 3 is provided as an example. Other examples may differ from what is described with regard to FIG. 3.

A UE that supports a dual subscriber identification module (SIM) dual-active (DSDA) mode may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription, and a second SIM card may be associated with a second subscription. The first subscription may be associated with a first RAT, such as NR. The second subscription may be associated with a second RAT, such as NR. The first subscription may be associated with a first network operator, and the second subscription may be associated with a second network operator. The first subscription and the second subscription may both be in a connected mode at the same time.

The UE may include a first Tx chain associated with the first subscription. The first Tx chain may perform uplink transmissions to a first network node. The UE may include a second Tx chain associated with the second subscription. The second Tx chain may perform uplink transmissions to a second network node. Alternatively, the UE may include a single Tx chain associated with both the first subscription and the second subscription based on a time division scheme of the single Tx chain between the first subscription and the second subscription. The first network node may be associated with a first network, and the second network node may be associated with a second network. In some cases, the first network node and the second network node may be a same network node in a same network.

In some cases, the UE may include multiple SIM cards (e.g., two or more SIM cards) associated with multiple subscriptions (e.g., two or more subscriptions), respectively. In this case, the UE may include multiple Tx chains (e.g., two or more Tx chains) corresponding to the multiple SIM cards and the multiple subscriptions, respectively.

The UE may operate in the DSDA mode only for certain band combinations of the two subscriptions, where a pair of bands which may allow the DSDA mode may be DSDA compatible bands. The UE may operate in the DSDA mode when the first subscription is associated with a first band and the second subscription is associated with a second band, where a pair of the first band and the second band are DSDA compatible bands. The UE may not operate in the DSDA mode when the pair of the first band and the second band are non-DSDA-compatible bands. If a subscription supports bands B1, B2, . . . , Bn, supporting all band combinations (Bi, Bj), i,j=1, . . . , n for the DSDA mode may be infeasible due to the vast quantity of band combinations required in hardware and implementation.

In the UE, the first subscription may be associated with the first band and the second subscription may be associated with the second band, where the first band and the second band may be DSDA-compatible bands. The first subscription and the second subscription may be configured with conditional handover. The first subscription may switch to a third band during the conditional handover. If the third band associated with the first subscription and the second band associated with the second subscription are non-DSDA-compatible bands, the UE may no longer be able to operate in the DSDA mode. Similarly, the second subscription may switch to the third band during the conditional handover. If the first band associated with the first subscription and the third band associated with the second subscription are non-DSDA-compatible bands, the UE may no longer be able to operate in the DSDA mode. In these cases, the UE needs to be configured to perform conditional handover in a manner that still maintains the DSDA mode for as long as possible.

In various aspects of techniques and apparatuses described herein, a UE may detect, via a first subscription of the UE, a trigger event for a conditional handover of the UE from a source network entity to a target network entity based at least in part on trigger event criteria being satisfied. The UE may determine, based at least in part on the trigger event, that a target band associated with the target network entity is not compatible with a serving band associated with a second subscription of the UE. The target band associated with the target network entity and the serving band associated with the second subscription may be non-DSDA-compatible bands. The UE may store the trigger event for the conditional handover in a buffer of the UE based at least in part on the target band associated with the target network entity not being compatible with the serving band associated with the second subscription. The UE may perform an action related to the conditional handover based at least in part on a condition being satisfied. The UE may perform the conditional handover based at least in part on the condition being satisfied. Alternatively, the UE may drop the trigger event from the buffer based at least in part on the condition being satisfied. By storing the event trigger in the buffer until the condition is satisfied and then performing the conditional handover, the UE may ensure that the conditional handover does not prevent the UE from remaining in a DSDA mode, since the DSDA mode may not be possible at the UE when the first subscription and the second subscription are associated with non-DSDA-compatible bands.

Figure 4A:
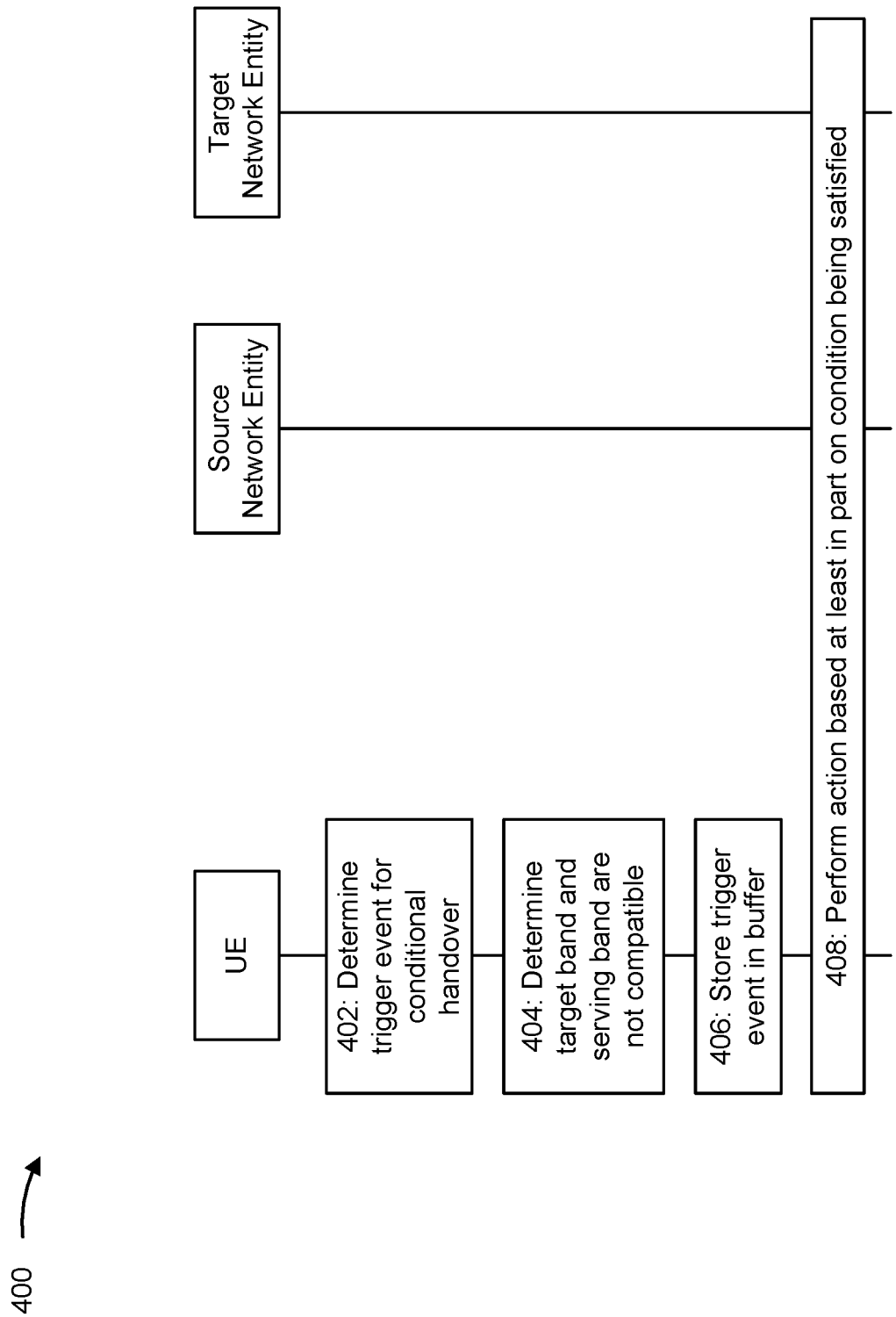
FIGS. 4A-4B are diagrams illustrating examples associated with conditional handover with multiple subscriptions, in accordance with the present disclosure.
Figure 4B:
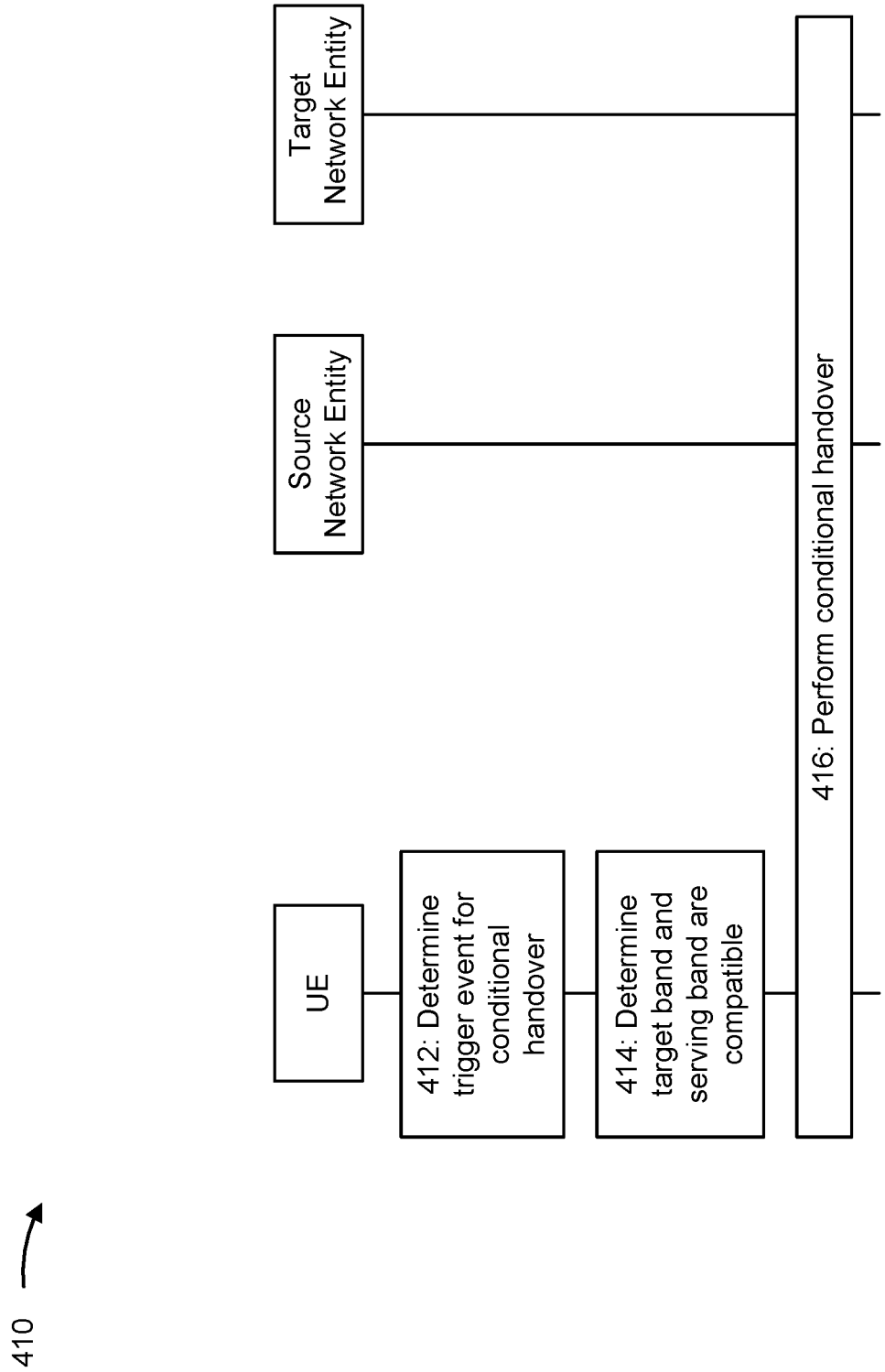

FIGS. 4A-4B are diagrams illustrating examples 400, 410 associated with conditional handover with multiple subscriptions, in accordance with the present disclosure. As shown in FIGS. 4A-4B, examples 400, 410 include communications between a UE (e.g., UE 120), a source network entity (e.g., base station 110a), and a target network entity (e.g., base station 110b). In some aspects, the UE, the source network entity, and the target network entity may be included in a wireless network, such as wireless network 100. The UE may include a first subscription and a second subscription.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As shown in FIG. 4A, and by reference number 402, the UE may determine, via a first subscription of the UE, a trigger event for a conditional handover of the UE from a source network entity to a target network entity based at least in part on trigger event criteria being satisfied. The trigger event may be an A3/A5 trigger event. The UE may detect an A3 trigger event based at least in part on a measurement associated with the target network entity being greater than a measurement associated with the source network entity by an offset. The UE may detect an A5 trigger event based at least in part on a measurement associated with the source network entity becoming less than a first threshold and a measurement associated with the target network entity becoming greater than a second threshold.

As shown by reference number 404, the UE may determine, based at least in part on the trigger event, that a target band associated with the target network entity is not compatible with a serving band associated with a second subscription of the UE. The UE may determine that the target band associated with the target network entity is not compatible with the serving band associated with the second subscription based at least in part on accessing a table of band combinations. The table of band combinations may list compatible and/or non-compatible band combinations. The target band associated with the target network entity and the serving band associated with the second subscription may be non-DSDA-compatible bands, which may prevent the first subscription and the second subscription from operating in a DSDA mode.

As shown by reference number 406, the UE may store the trigger event for the conditional handover in a buffer of the UE based at least in part on the target band associated with the target network entity not being compatible with the serving band associated with the second subscription. The UE may store the trigger event in the buffer until a condition is satisfied. By storing the trigger event in the buffer, the UE may delay the conditional handover associated with the trigger event. The UE may prefer to delay the conditional handover since the conditional handover, at present conditions (e.g., without the condition being satisfied), may result in the first subscription and the second subscription being associated with non-DSDA-compatible bands, which may cause the UE to terminate a DSDA mode operation. The UE may prefer to remain in the DSDA mode for as long as possible, so the UE is able to support two different subscriptions at a same time.

As shown by reference number 408, the UE may perform an action related to the conditional handover based at least in part on the condition being satisfied. The action may involve performing the conditional handover, or alternatively, the action may involve dropping the trigger event from the buffer and not performing the conditional handover.

In some aspects, the UE may determine that a connection associated with the second subscription has been released, which may satisfy the condition. The UE may perform, via the first subscription and based at least in part on the trigger event, the conditional handover to establish a connection between the UE and the target network entity and to terminate a connection between the UE and the source network entity.

In some aspects, the UE may determine that the second subscription has a handover or a reestablishment to another serving band that is compatible with the target band associated with the target network entity, which may satisfy the condition. The UE may perform, via the first subscription and based at least in part on the trigger event, the conditional handover to establish the connection between the UE and the target network entity and to terminate the connection between the UE and the source network entity.

In some aspects, the trigger event may be a first trigger event, the target band may be a first target band, and the conditional handover may be a first conditional handover. The UE may detect, via the first subscription, a second trigger event associated with a second target band that is compatible with the serving band associated with the second subscription, which may satisfy the condition. The UE may drop the first trigger event for the first conditional handover from the buffer. The UE may perform, via the first subscription and based at least in part on the second trigger event, a second conditional handover to establish the connection between the UE and the target network entity and to terminate the connection between the UE and the source network entity.

In some aspects, the UE may detect a radio link failure (RLF) associated with the first subscription, which may satisfy the condition. The UE may drop the trigger event for the conditional handover from the buffer based at least in part on the RLF associated with the first subscription. In some aspects, the UE may determine that a duration of time associated with the trigger event for the conditional handover being stored in the buffer satisfies a threshold, which may satisfy the condition. The UE may drop the trigger event for the conditional handover from the buffer based at least in part on the duration of time satisfying the threshold. In some aspects, the UE may determine that the trigger event no longer satisfies the trigger event criteria, which may satisfy the condition. The UE may drop the trigger event for the conditional handover from the buffer based at least in part on the trigger event no longer satisfying the trigger event criteria.

In some aspects, the UE may store multiple trigger events including the trigger event in the buffer. The UE may remove the trigger event from the multiple trigger events based at least in part on an age associated with the trigger event or a measurement value associated with the trigger event in relation to other measurement values associated with other trigger events of the multiple trigger events. In some aspects, the first subscription may be associated with one or more trigger events for conditional handovers and the second subscription may be associated with one or more trigger events for conditional handovers. The one or more trigger events associated with the first subscription and the one or more trigger events associated with the second subscription may occur during a same time window.

As shown in FIG. 4B, and by reference number 412, the UE may determine, via the first subscription of the UE, the trigger event for the conditional handover of the UE from the source network entity to the target network entity based at least in part on the trigger event criteria being satisfied, similar to reference number 402.

As shown by reference number 414, the UE may determine that the target band associated with the target network entity is compatible with the serving band associated with the second subscription of the UE. The UE may determine that the target band associated with the target network entity is compatible with the serving band associated with the second subscription based at least in part on accessing the table of band combinations. The table of band combinations may list compatible and/or non-compatible band combinations. The target band associated with the target network entity and the serving band associated with the second subscription may be DSDA-compatible bands, which may allow the first subscription and the second subscription to operate in the DSDA mode.

As shown by reference number 416, the UE may perform, via the first subscription, the conditional handover to establish the connection between the UE and the target network entity and to terminate the connection between the UE and the source network entity. When performing the conditional handover, the UE may transmit, via the first subscription to the target network entity, an RAR preamble. When performing the conditional handover, the UE may receive, via the first subscription from the target network entity, an RAR.

As indicated above, FIGS. 4A-4B are provided as examples. Other examples may differ from what is described with regard to FIGS. 4A-4B.

Figure 5:
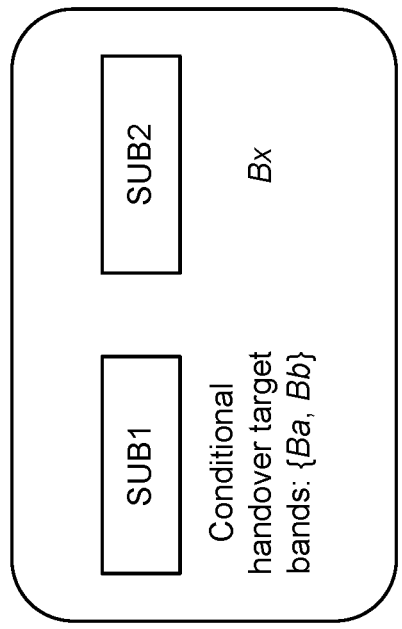
FIG. 5 is a diagram illustrating an example associated with dual subscriber identification module (SIM) dual-active (DSDA)-compatible bands, in accordance with the present disclosure.

FIG. 5 is a diagram illustrating an example 500 associated with DSDA-compatible bands, in accordance with the present disclosure.

As shown in FIG. 5, a first subscription of a UE may be configured with conditional handover at multiple target frequencies of PCIs, such as fa, fb of multiple bands Ba, Bb, respectively. A second subscription of the UE may be currently operating at a serving frequency of band Bx. The UE may determine whether or not each band pair allows the UE to operate in a DSDA mode. The UE may access a table of band combinations, and whether a particular band combination permits the DSDA mode or does not permit the DSDA mode. For example, the table may indicate that a combination of band Ba for the first subscription and band Bx for the second subscription permits the DSDA mode (e.g., band Ba may be an intra-frequency handover band that is compatible with band Bx), but that a combination of band Bb for the first subscription and band Bx for the second subscription does not permit the DSDA mode. The UE, when performing the conditional handover for the first subscription, may switch to band Ba instead of band Bb so the UE is able to remain in the DSDA mode.

As indicated above, FIG. 5 is provided as an example. Other examples may differ from what is described with regard to FIG. 5.

Figure 6:
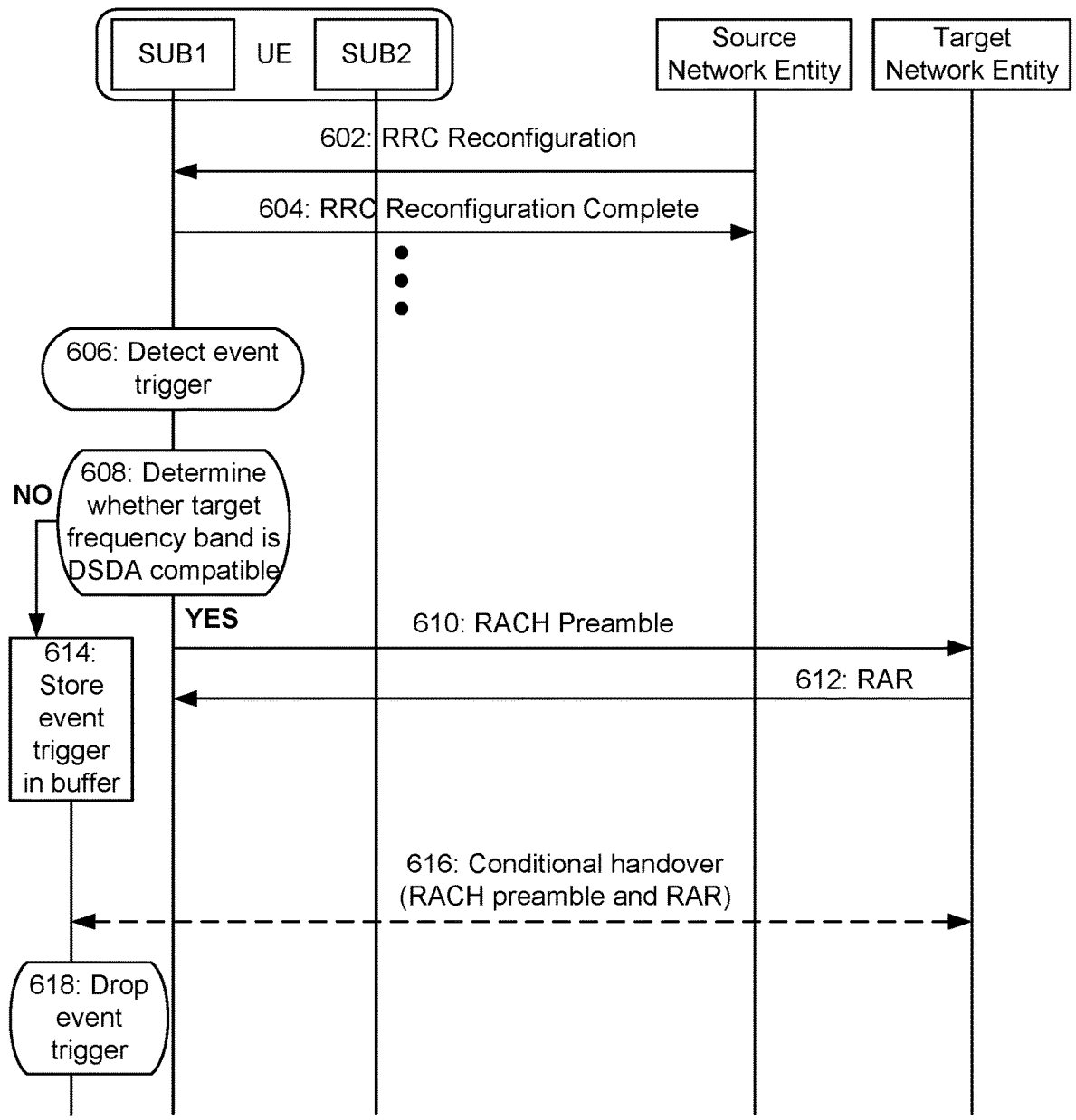
FIG. 6 is a diagram illustrating an example associated with conditional handover with multiple subscriptions, in accordance with the present disclosure.

FIG. 6 is a diagram illustrating an example 600 associated with conditional handover with multiple subscriptions, in accordance with the present disclosure. As shown in FIG. 6, example 600 includes communication between a UE (e.g., UE 120), a source network entity (e.g., base station 110a), and a target network entity (e.g., base station 110b). In some aspects, the UE, the source network entity, and the target network entity may be included in a wireless network, such as wireless network 100. The UE may include a first subscription and a second subscription.

As shown by reference number 602, the UE may receive, via the first subscription and from the source network entity, an RRC reconfiguration IE, which may be associated with a conditional reconfiguration IE and a conditional trigger configuration IE.

As shown by reference number 604, the UE may transmit, via the first subscription and to the source network entity, an RRC reconfiguration complete IE based at least in part on the RRC reconfiguration IE.

As shown by reference number 606, the UE may detect, via the first subscription, a trigger event for a PCI associated with the target network entity, based at least in part on the RRC reconfiguration IE, the conditional reconfiguration IE, and/or the conditional trigger configuration IE. The UE may detect an A3 trigger event based at least in part on a measurement associated with the target network entity being greater than a measurement associated with the source network entity by an offset. The UE may detect an A5 trigger event based at least in part on a measurement associated with the source network entity becoming less than a first threshold and a measurement associated with the target network entity becoming greater than a second threshold. The trigger event may cause the first subscription of the UE to perform a conditional handover to the target network entity.

As shown by reference number 608, the UE may determine, via the first subscription, whether a target band of the PCI associated with the target network entity is a DSDA-compatible band. The target band may be a target frequency band. The UE may determine whether the target band for the first subscription and a serving band associated with the second subscription are DSDA-compatible bands. The serving band may be a serving frequency band. The UE may access a table stored in a memory of the UE to determine whether the target band for the first subscription and the serving band associated with the second subscription are DSDA-compatible bands. The table may list a plurality of DSDA-compatible bands and/or non-DSDA-compatible bands. Depending on the table, the UE may determine whether the target band for the first subscription and the serving band associated with the second subscription are DSDA-compatible bands.

In some aspects, when the UE determines that the target band for the first subscription and the serving band associated with the second subscription are DSDA-compatible bands, the UE may continue with the conditional handover for the first subscription. In other words, when the first subscription has the trigger event for the conditional handover and the target band is a DSDA-compatible band, the trigger event may cause the conditional handover to be performed.

As shown by reference number 610, the UE may transmit, via the first subscription, a RACH preamble to the target network entity. The UE may transmit the RACH preamble as part of the conditional handover, which may be performed based at least in part on the target band being the DSDA-compatible band.

As shown by reference number 612, the UE may receive, via the first subscription, an RAR from the target network entity. The UE may receive the RAR from the target network entity as part of the conditional handover.

As shown by reference number 614, when the UE determines via the first subscription that the target band for the first subscription and the serving band associated with the second subscription are non-DSDA-compatible bands, the UE may store the trigger event in a buffer of the UE. Storing the trigger event in the buffer may delay the conditional handover for the first subscription. The UE may store the trigger event in the buffer until a condition is satisfied (e.g., both subscriptions are able to use bands that are DSDA-compatible bands), at which point the UE may perform the conditional handover for the first subscription (as shown by reference number 616), or at which point the UE may drop the trigger event and not perform the conditional handover for the first subscription (as shown by reference number 618). The UE may store the trigger event in the buffer to enable DSDA mode operation for as long as possible.

In some aspects, the UE may store, via the first subscription, the trigger event in the buffer until the second subscription releases its connection. The second subscription may move from a connected state to an idle state. At this point, the UE may enter into a dual SIM dual-standby (DSDS) mode, which may not have the restrictions associated with having DSDA-compatible bands. The UE may perform the conditional handover for the first subscription using the target band.

In some aspects, the UE may store, via the first subscription, the trigger event in the buffer until the second subscription has a handover or reestablishes to another frequency in a band which is a DSDA-compatible band. The UE may perform the conditional handover for the first subscription using the target band, which may be possible since the target band and the other band for the second subscription are DSDA-compatible bands.

In some aspects, the UE may store, via the first subscription, the trigger event in the buffer until the first subscription has a second trigger event associated with a second conditional handover. The second trigger event may be associated with a second target band, which may be a DSDA-compatible band. The UE may drop the trigger event initially stored in the buffer, since only one trigger event may be buffered at a time. The UE may perform the second conditional handover for the first subscription using the second target band. In other words, the UE may have a newer trigger event to another target band that is a DSDA-compatible band, and as a result, an older trigger event may be dropped from the buffer and the newer trigger event may be used for the conditional handover.

In some aspects, the UE may store, via the first subscription, the trigger event in the buffer until the first subscription enters an RLF. The first subscription may reestablish a connection to an NR cell, which may result in the trigger event being dropped from the buffer.

In some aspects, the UE may store, via the first subscription, the trigger event in the buffer until the trigger event is stored for a duration of time that exceeds a time threshold. For example, after storing the trigger event in the buffer, the UE may start a timer. When the timer expires after the duration of time, the trigger event may be dropped from the buffer.

In some aspects, the UE may store, via the first subscription, the trigger event in the buffer until the trigger event no longer meets an A3/A5 event condition. For example, the measurement associated with the target network entity may not be greater than the measurement associated with the source network entity by the offset, or the measurement associated with the source network entity may not be less than the first threshold and the measurement associated with the target network entity may not be greater than the second threshold. When the trigger event in the buffer no longer meets the A3/A5 event condition, the trigger event may be dropped from the buffer.

As indicated above, FIG. 6 is provided as an example. Other examples may differ from what is described with regard to FIG. 6.

Figure 7:
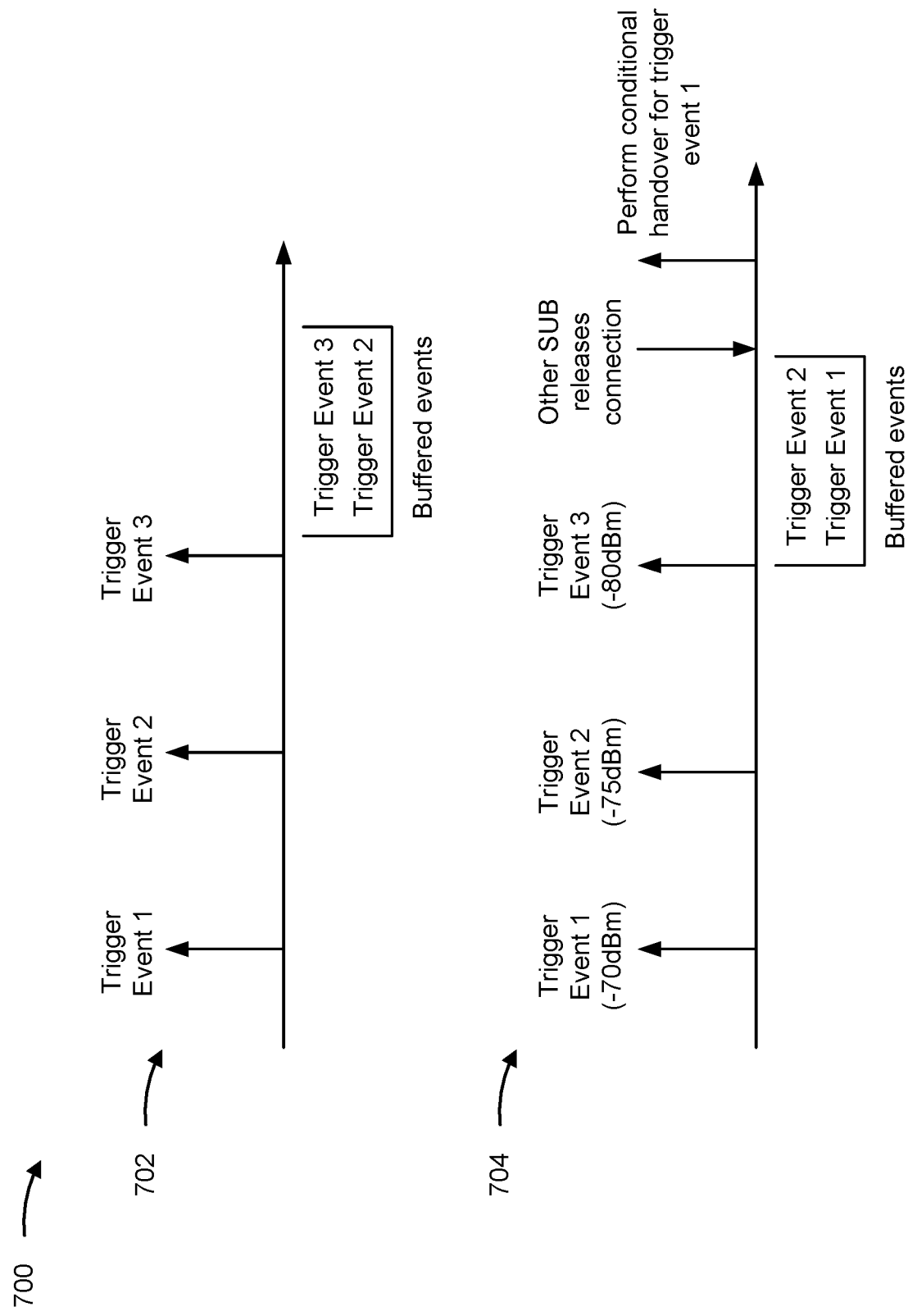
FIG. 7 is a diagram illustrating an example associated with multiple trigger events, in accordance with the present disclosure.

FIG. 7 is a diagram illustrating an example 700 associated with multiple trigger events, in accordance with the present disclosure.

In some aspects, a UE may buffer multiple trigger events, for example, due to multiple candidate cells triggering events (e.g., A3 events) relatively close in time. The UE may limit up to two trigger events to be stored at a same time in a buffer, which may reduce complexity at the UE. The UE may store up to two trigger events, instead of a single trigger event, in case some trigger events do not satisfy DSDA-compatible band criteria (e.g., a trigger event that would result in non-DSDA-compatible bands).

As shown by reference number 702, a UE may detect a first trigger event, a second trigger event, and a third trigger event. The first trigger event may be associated with a first candidate cell, the second trigger event may be associated with a second candidate cell, and the third trigger event may be associated with a third candidate cell. The UE may store the first trigger event and the second trigger event in the buffer. When the third trigger event is detected, the first trigger event and a corresponding handover target may be dropped from the buffer. The UE may buffer newer trigger events and discard older trigger events.

As shown by reference number 704, the UE may detect a first trigger event, a second trigger event, and a third trigger event. The first trigger event may be associated with a first candidate cell having a first RSRP (e.g., −70 dBm), the second trigger event may be associated with a second candidate cell having a second RSRP (e.g., −75 dBm), and a third trigger event may be associated with a third candidate cell having a third RSRP (e.g., −80 dBm). The UE may store up to two trigger events associated with the best RSRPs in relation to other trigger events. In this example, the third RSRP associated with the third trigger event is lower than the first RSRP and the second RSRP, the UE may drop the third trigger event from the buffer, even though the third trigger event may be detected later in time as compared to the first trigger event and the second trigger event. Alternatively, the second trigger event may only be stored in the buffer when the second RSRP is lower than the third RSRP but within a defined margin of the first RSRP, where the second RSRP may be the lowest RSRP among the first RSRP, the second RSRP, and the third RSRP. This alternative may balance recency and signal quality when storing trigger events.

In some aspects, the UE may detect, via a first subscription of the UE, the first trigger event, the second trigger event, and the third trigger event. When a second subscription of the UE is released (e.g., the second subscription is no longer in a connected mode), one of the trigger events stored in the buffer may be used to perform a conditional handover. The UE may select, via the first subscription, one of the trigger events stored in the buffer and corresponding candidate cell for the conditional handover. The UE may select the trigger event corresponding to the candidate cell with the best RSRP as compared to other trigger events and corresponding candidate cells.

As indicated above, FIG. 7 is provided as an example. Other examples may differ from what is described with regard to FIG. 7.

Figure 8:
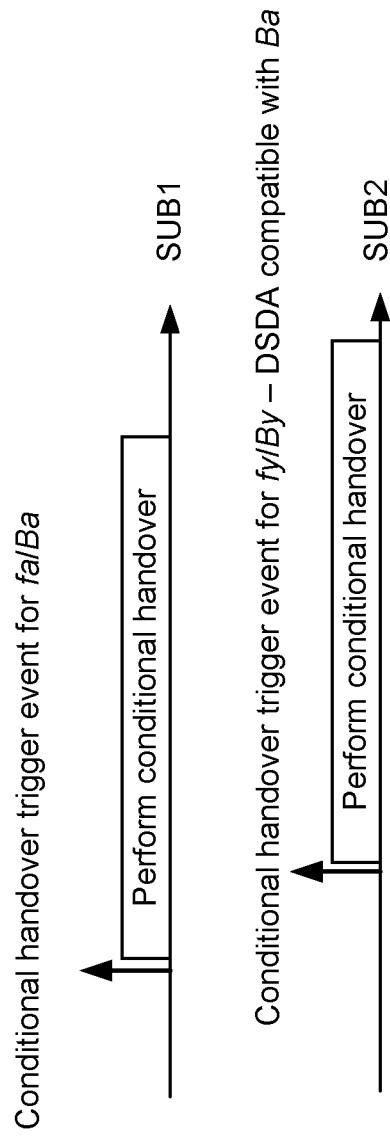
FIGS. 8-9 are diagrams illustrating examples associated with concurrent conditional handovers on two subscriptions, in accordance with the present disclosure.

FIG. 8 is a diagram illustrating an example 800 associated with concurrent conditional handovers on two subscriptions, in accordance with the present disclosure.

As shown in FIG. 8, a first subscription of a UE and a second subscription of the UE may have concurrent conditional handovers. The first subscription may detect a first trigger event for a first conditional handover. The first trigger event may trigger the first conditional handover on a target frequency Fa of band Ba. At a later point in time, the second subscription may detect a second trigger event for a second conditional handover. The second trigger event may trigger the second conditional handover on a target frequency Fy of band By. The UE may determine that band By and band Ba are DSDA-compatible bands. The UE may access a table of band combinations, and whether a particular band combination permits a DSDA mode or does not permit the DSDA mode. For example, the table may indicate that a combination of band Ba for the first subscription and band By for the second subscription permits the DSDA mode, but that a combination of band Ba for the first subscription and band Bz for the second subscription does not permit the DSDA mode. Since band By and band Ba are DSDA-compatible bands, both the first subscription and the second subscription may perform the concurrent conditional handovers.

As indicated above, FIG. 8 is provided as an example. Other examples may differ from what is described with regard to FIG. 8.

Figure 9:
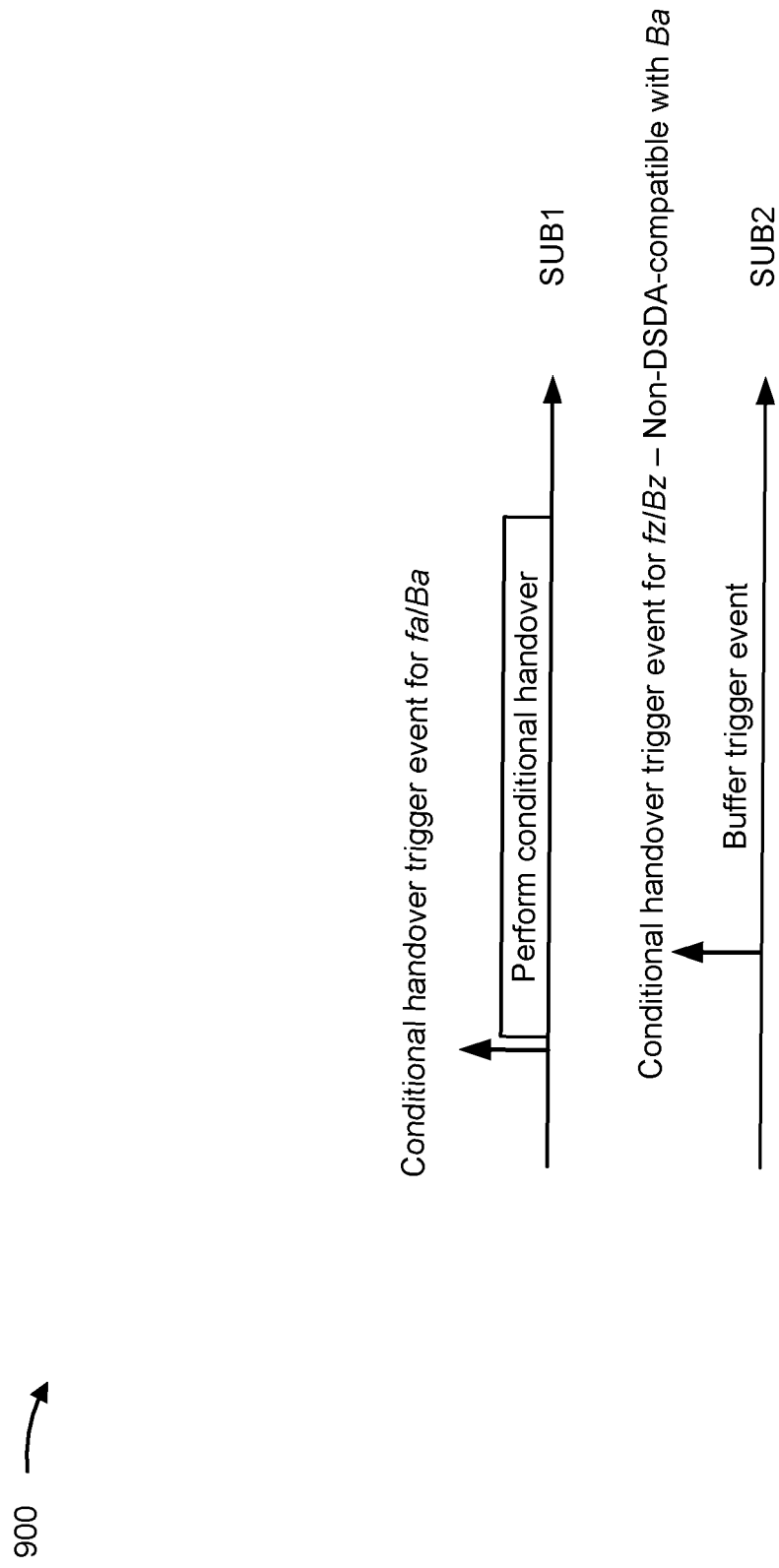

FIG. 9 is a diagram illustrating an example 900 associated with concurrent conditional handovers on two subscriptions, in accordance with the present disclosure.

As shown in FIG. 9, a first subscription of a UE and a second subscription of the UE may have concurrent conditional handovers. The first subscription may detect a first trigger event for a first conditional handover. The first trigger event may trigger the first conditional handover on a target frequency Fa of band Ba. At a later point in time, the second subscription may detect a second trigger event for a second conditional handover. The second trigger event may trigger the second conditional handover on a target frequency Fz of band Bz. The UE may determine that band Ba is a DSDA-compatible band and that band Bz is a non-DSDA-compatible band, based at least in part by accessing a table of band combinations.

In some aspects, since band Ba is a DSDA-compatible band, the UE may perform the first conditional handover via the first subscription. However, since band Bz is a non-DSDA-compatible band, the UE may store, via the second subscription, the second trigger event in a buffer until a condition is satisfied. In some aspects, after the first subscription releases its connection and the UE may be able to enter a DSDS mode without having restrictions associated with having DSDA-compatible bands, the UE may perform the second conditional handover for the second subscription using band Bz. In some aspects, after the first subscription has a handover or reestablishes to another frequency in a band which is a DSDA-compatible band, the UE may perform the second conditional handover for the second subscription using band Bz. In some aspects, after the second subscription has another trigger event for conditional handover to another target band that is a DSDA-compatible band, the UE may perform the conditional handover for the second subscription based at least in part on the other trigger event. In some aspects, after the second subscription enters an RLF, the UE may drop the second trigger event from the buffer (e.g., discard the second trigger event in the buffer). In some aspects, when the second trigger event is stored in the buffer for a duration of time that exceeds a time duration, the UE may drop the second trigger event from the buffer. In some aspects, when the second trigger event no longer meets an event condition, the UE may drop the second trigger event from the buffer. When the second trigger event is removed from the buffer, the UE no longer performs the second conditional handover for the second subscription.

As indicated above, FIG. 9 is provided as an example. Other examples may differ from what is described with regard to FIG. 9.

Figure 10:
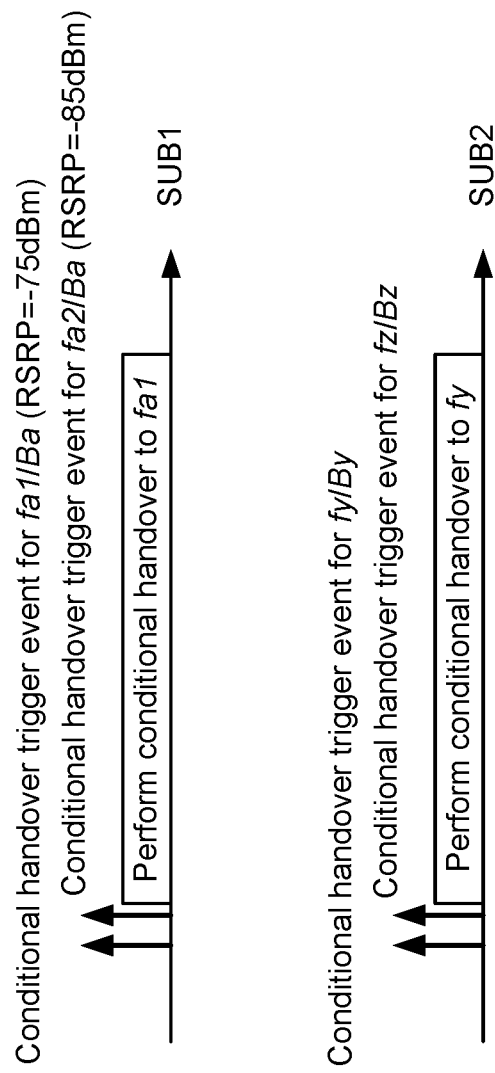
FIG. 10 is a diagram illustrating an example associated with concurrent conditional handovers with multiple trigger events on two subscriptions, in accordance with the present disclosure.

FIG. 10 is a diagram illustrating an example 1000 associated with concurrent conditional handovers with multiple trigger events on two subscriptions, in accordance with the present disclosure.

In some aspects, a first subscription of a UE and a second subscription of the UE may have concurrent conditional handovers with multiple trigger events during a relatively small time window. The UE may select a best pair of trigger events for executing the concurrent conditional handovers on the first subscription and on the second subscription.

As shown in FIG. 10, the first subscription may detect a first trigger event for a first conditional handover. The first conditional handover may be associated with a target frequency Fa1 of band Ba, which may be associated with an RSRP of −75 dBm. The first subscription may detect a second trigger event for a second conditional handover. The second conditional handover may be associated with a target frequency Fa2 of band Ba, which may be associated with an RSRP of −85 dBm. The second subscription may detect a third trigger event for a third conditional handover. The third conditional handover may be associated with a target frequency Fy of band By. The second subscription may detect a fourth trigger event for a fourth conditional handover. The fourth conditional handover may be associated with a target frequency Fz of band Bz. The UE may select the best pair of trigger events (e.g., the first trigger event or the second trigger event, and the third trigger event or the fourth trigger event) based at least in part on DSDA-compatible bands and/or RSRP. For example, the UE may select a pair of the first trigger event and the third trigger event, which may cause the first subscription to perform the first conditional handover to the target frequency Fa1 of band Ba, and the second subscription to perform the third conditional handover to the target frequency Fy of band By.

As indicated above, FIG. 10 is provided as an example. Other examples may differ from what is described with regard to FIG. 10.

Figure 11:
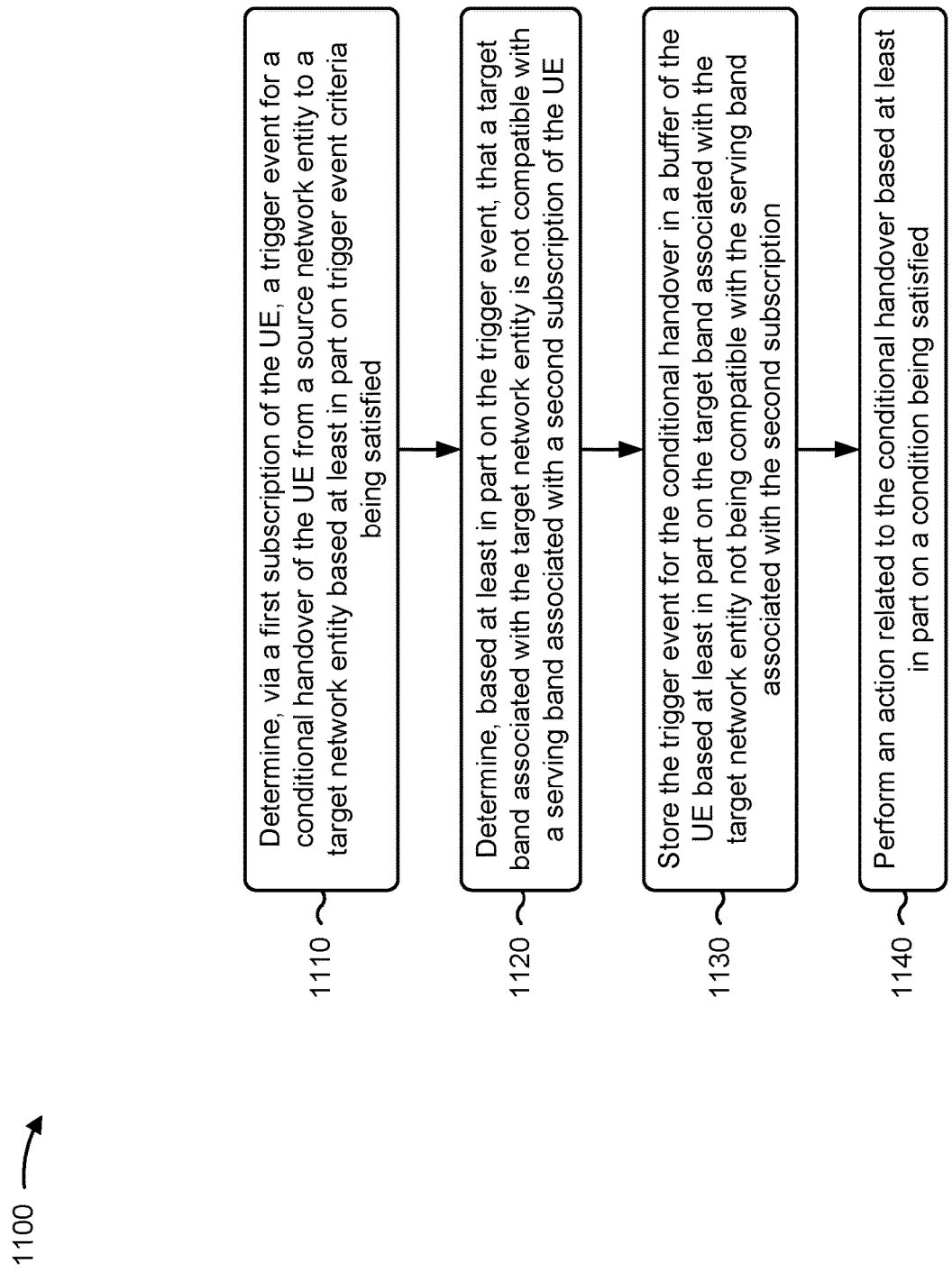
FIGS. 11-12 are diagrams illustrating example processes associated with conditional handover with multiple subscriptions, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with conditional handover with multiple subscriptions.

As shown in FIG. 11, in some aspects, process 1100 may include determining, via a first subscription of the UE, a trigger event for a conditional handover of the UE from a source network entity to a target network entity based at least in part on trigger event criteria being satisfied (block 1110). For example, the UE (e.g., using communication manager 140 and/or determination component 1308, depicted in FIG. 13) may determine, via a first subscription of the UE, a trigger event for a conditional handover of the UE from a source network entity to a target network entity based at least in part on trigger event criteria being satisfied, as described above.

As further shown in FIG. 11, in some aspects, process 1100 may include determining, based at least in part on the trigger event, that a target band associated with the target network entity is not compatible with a serving band associated with a second subscription of the UE (block 1120). For example, the UE (e.g., using communication manager 140 and/or determination component 1308, depicted in FIG. 13) may determine, based at least in part on the trigger event, that a target band associated with the target network entity is not compatible with a serving band associated with a second subscription of the UE, as described above.

As further shown in FIG. 11, in some aspects, process 1100 may include storing the trigger event for the conditional handover in a buffer of the UE based at least in part on the target band associated with the target network entity not being compatible with the serving band associated with the second subscription (block 1130). For example, the UE (e.g., using communication manager 140 and/or storage component 1310, depicted in FIG. 13) may store the trigger event for the conditional handover in a buffer of the UE based at least in part on the target band associated with the target network entity not being compatible with the serving band associated with the second subscription, as described above.

As further shown in FIG. 11, in some aspects, process 1100 may include performing an action related to the conditional handover based at least in part on a condition being satisfied (block 1140). For example, the UE (e.g., using communication manager 140 and/or action component 1312, depicted in FIG. 13) may perform an action related to the conditional handover based at least in part on a condition being satisfied, as described above.

Process 1100 may include additional aspects, such as any single aspect or any combination of aspects described below and/or in connection with one or more other processes described elsewhere herein.

In a first aspect, process 1100 includes determining that the target band associated with the target network entity is not compatible with the serving band associated with the second subscription based at least in part on accessing a table of band combinations.

In a second aspect, alone or in combination with the first aspect, the target band associated with the target network entity and the serving band associated with the second subscription are non-DSDA-compatible bands that prevent the first subscription and the second subscription from operating in a DSDA mode.

In a third aspect, alone or in combination with one or more of the first and second aspects, process 1100 includes determining that a connection associated with the second subscription has been released, and performing, via the first subscription and based at least in part on the trigger event, the conditional handover to establish a connection between the UE and the target network entity and to terminate a connection between the UE and the source network entity.

In a fourth aspect, alone or in combination with one or more of the first through third aspects, process 1100 includes determining that the second subscription has a handover or a reestablishment to another serving band that is compatible with the target band associated with the target network entity, and performing, via the first subscription and based at least in part on the trigger event, the conditional handover to establish a connection between the UE and the target network entity and to terminate a connection between the UE and the source network entity.

In a fifth aspect, alone or in combination with one or more of the first through fourth aspects, the trigger event is a first trigger event, the target band is a first target band, and the conditional handover is a first conditional handover, and process 1100 includes determining, via the first subscription, a second trigger event associated with a second target band that is compatible with the serving band associated with the second subscription, dropping the first trigger event for the first conditional handover from the buffer, and performing, via the first subscription and based at least in part on the second trigger event, a second conditional handover to establish a connection between the UE and the target network entity and to terminate a connection between the UE and the source network entity.

In a sixth aspect, alone or in combination with one or more of the first through fifth aspects, process 1100 includes detecting an RLF associated with the first subscription, and dropping the trigger event for the conditional handover from the buffer based at least in part on the RLF associated with the first subscription.

In a seventh aspect, alone or in combination with one or more of the first through sixth aspects, process 1100 includes determining that a duration of time associated with the trigger event for the conditional handover being stored in the buffer satisfies a threshold, and dropping the trigger event for the conditional handover from the buffer based at least in part on the duration of time satisfying the threshold.

In an eighth aspect, alone or in combination with one or more of the first through seventh aspects, process 1100 includes determining that the trigger event no longer satisfies the trigger event criteria, and dropping the trigger event for the conditional handover from the buffer based at least in part on the trigger event no longer satisfying the trigger event criteria.

In a ninth aspect, alone or in combination with one or more of the first through eighth aspects, process 1100 includes storing multiple trigger events including the trigger event in the buffer, and removing the trigger event from the multiple trigger events based at least in part on an age associated with the trigger event or a measurement value associated with the trigger event in relation to other measurement values associated with other trigger events of the multiple trigger events.

In a tenth aspect, alone or in combination with one or more of the first through ninth aspects, the first subscription is associated with one or more trigger events for conditional handovers and the second subscription is associated with one or more trigger events for conditional handovers, and the one or more trigger events associated with the first subscription and the one or more trigger events associated with the second subscription occur during a same time window.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
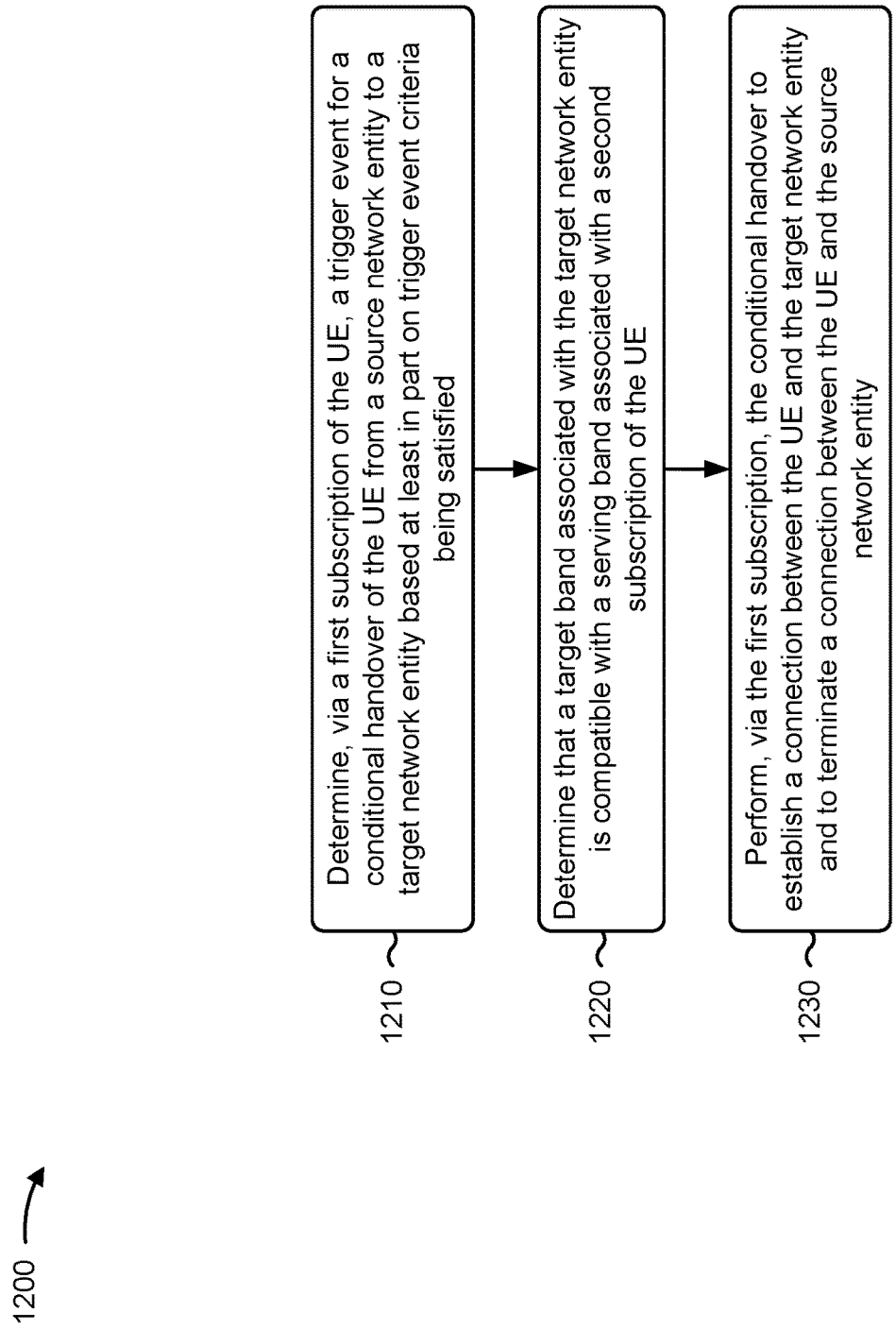

FIG. 12 is a diagram illustrating an example process 1200 performed, for example, by a UE, in accordance with the present disclosure. Example process 1200 is an example where the UE (e.g., UE 120) performs operations associated with conditional handover with multiple subscriptions.

As shown in FIG. 12, in some aspects, process 1200 may include determining, via a first subscription of the UE, a trigger event for a conditional handover of the UE from a source network entity to a target network entity based at least in part on trigger event criteria being satisfied (block 1210). For example, the UE (e.g., using communication manager 140 and/or determination component 1308, depicted in FIG. 13) may determine, via a first subscription of the UE, a trigger event for a conditional handover of the UE from a source network entity to a target network entity based at least in part on trigger event criteria being satisfied, as described above.

As further shown in FIG. 12, in some aspects, process 1200 may include determining that a target band associated with the target network entity is compatible with a serving band associated with a second subscription of the UE (block 1220). For example, the UE (e.g., using communication manager 140 and/or determination component 1308, depicted in FIG. 13) may determine that a target band associated with the target network entity is compatible with a serving band associated with a second subscription of the UE, as described above.

As further shown in FIG. 12, in some aspects, process 1200 may include performing, via the first subscription, the conditional handover to establish a connection between the UE and the target network entity and to terminate a connection between the UE and the source network entity (block 1230). For example, the UE (e.g., using communication manager 140 and/or action component 1312, depicted in FIG. 13) may perform, via the first subscription, the conditional handover to establish a connection between the UE and the target network entity and to terminate a connection between the UE and the source network entity, as described above.

Process 1200 may include additional aspects, such as any single aspect or any combination of aspects described below and/or in connection with one or more other processes described elsewhere herein.

In a first aspect, process 1200 includes determining that the target band associated with the target network entity is compatible with the serving band associated with the second subscription based at least in part on accessing a table of band combinations.

In a second aspect, alone or in combination with the first aspect, the target band associated with the target network entity and the serving band associated with the second subscription are DSDA-compatible bands that allow the first subscription and the second subscription to operate in a DSDA mode.

In a third aspect, alone or in combination with one or more of the first and second aspects, process 1200 includes transmitting, via the first subscription to the target network entity, a random access channel preamble, and receiving, via the first subscription from the target network entity, a random access response.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
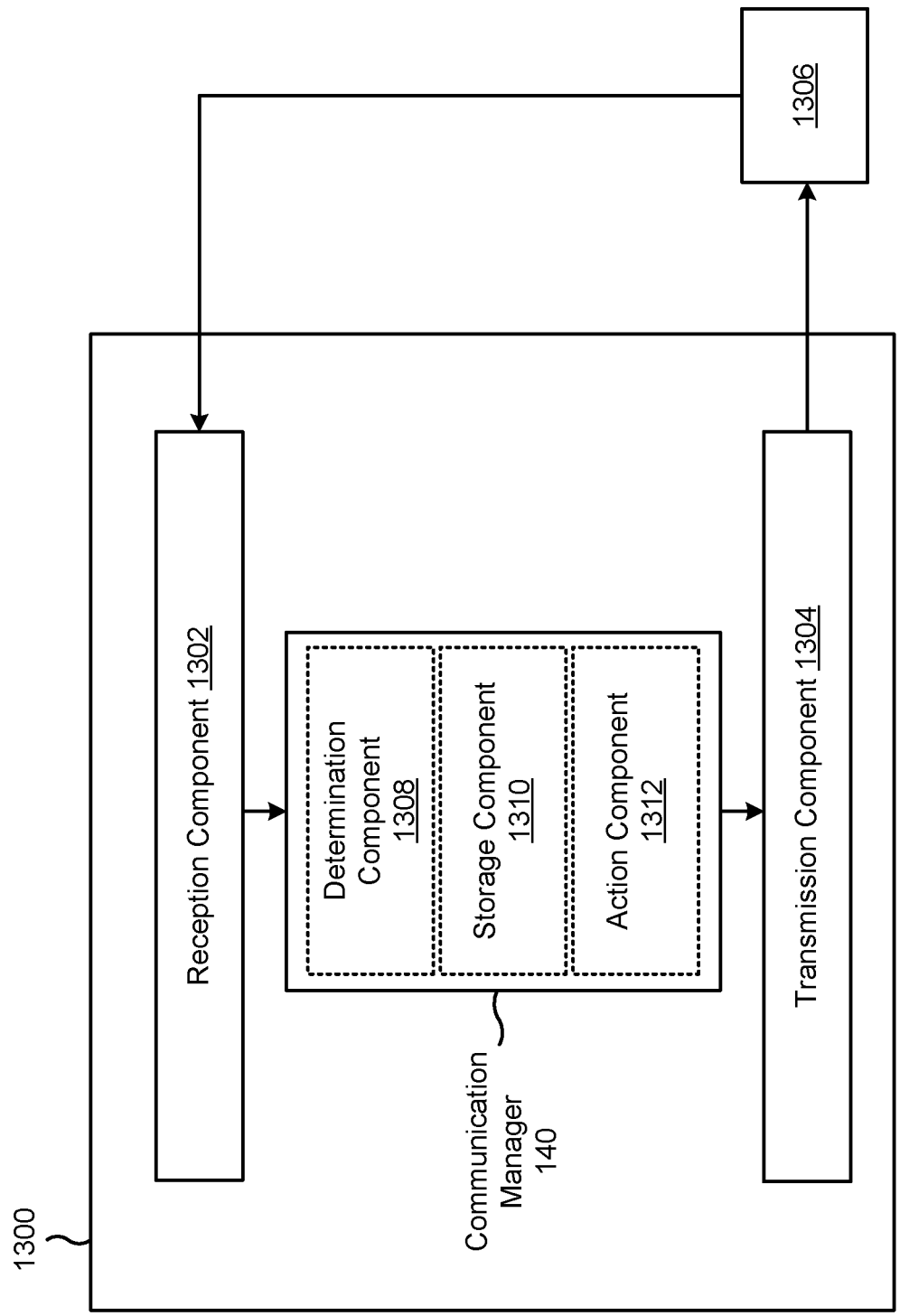
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a determination component 1308, a storage component 1310, or an action component 1312, among other examples.

In some aspects, the apparatus 1300 may be configured to perform one or more operations described herein in connection with FIGS. 4A-11. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The determination component 1308 may determine, via a first subscription of the UE, a trigger event for a conditional handover of the UE from a source network entity to a target network entity based at least in part on trigger event criteria being satisfied. The determination component 1308 may determine, based at least in part on the trigger event, that a target band associated with the target network entity is not compatible with a serving band associated with a second subscription of the UE. The storage component 1310 may store the trigger event for the conditional handover in a buffer of the UE based at least in part on the target band associated with the target network entity not being compatible with the serving band associated with the second subscription. The action component 1312 may perform an action related to the conditional handover based at least in part on a condition being satisfied.

The determination component 1308 may determine that the target band associated with the target network entity is not compatible with the serving band associated with the second subscription based at least in part on accessing a table of band combinations.

The action component 1312 may determine that a connection associated with the second subscription has been released. The action component 1312 may perform, via the first subscription and based at least in part on the trigger event, the conditional handover to establish a connection between the UE and the target network entity and to terminate a connection between the UE and the source network entity.

The action component 1312 may determine that the second subscription has a handover or a reestablishment to another serving band that is compatible with the target band associated with the target network entity. The action component 1312 may perform, via the first subscription and based at least in part on the trigger event, the conditional handover to establish a connection between the UE and the target network entity and to terminate a connection between the UE and the source network entity.

The action component 1312 may determine, via the first subscription, a second trigger event associated with a second target band that is compatible with the serving band associated with the second subscription. The action component 1312 may drop the first trigger event for the first conditional handover from the buffer. The action component 1312 may perform, via the first subscription and based at least in part on the second trigger event, a second conditional handover to establish a connection between the UE and the target network entity and to terminate a connection between the UE and the source network entity.

The action component 1312 may detect an RLF associated with the first subscription. The action component 1312 may drop the trigger event for the conditional handover from the buffer based at least in part on the RLF associated with the first subscription. The action component 1312 may determine that a duration of time associated with the trigger event for the conditional handover being stored in the buffer satisfies a threshold. The action component 1312 may drop the trigger event for the conditional handover from the buffer based at least in part on the duration of time satisfying the threshold. The action component 1312 may determine that the trigger event no longer satisfies the trigger event criteria. The action component 1312 may drop the trigger event for the conditional handover from the buffer based at least in part on the trigger event no longer satisfying the trigger event criteria.

The determination component 1308 may determine, via a first subscription of the UE, a trigger event for a conditional handover of the UE from a source network entity to a target network entity based at least in part on trigger event criteria being satisfied. The determination component 1308 may determine that a target band associated with the target network entity is compatible with a serving band associated with a second subscription of the UE. The action component 1312 may perform, via the first subscription, the conditional handover to establish a connection between the UE and the target network entity and to terminate a connection between the UE and the source network entity. The transmission component 1304 may transmit, via the first subscription to the target network entity, a random access channel preamble. The reception component 1302 may receive, via the first subscription from the target network entity, a random access response.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: determining, via a first subscription of the UE, a trigger event for a conditional handover of the UE from a source network entity to a target network entity based at least in part on trigger event criteria being satisfied; determining, based at least in part on the trigger event, that a target band associated with the target network entity is not compatible with a serving band associated with a second subscription of the UE; storing the trigger event for the conditional handover in a buffer of the UE based at least in part on the target band associated with the target network entity not being compatible with the serving band associated with the second subscription; and performing an action related to the conditional handover based at least in part on a condition being satisfied.

Aspect 2: The method of Aspect 1, wherein determining that the target band associated with the target network entity is not compatible with the serving band associated with the second subscription is based at least in part on accessing a table of band combinations.

Aspect 3: The method of any of Aspects 1 through 2, wherein the target band associated with the target network entity and the serving band associated with the second subscription are non-dual-subscriber identification module (SIM) dual-active (DSDA)-compatible bands that prevent the first subscription and the second subscription from operating in a DSDA mode.

Aspect 4: The method of any of Aspects 1 through 3, wherein performing the action related to the conditional handover based at least in part on the condition being satisfied further comprises: determining that a connection associated with the second subscription has been released; and performing, via the first subscription and based at least in part on the trigger event, the conditional handover to establish a connection between the UE and the target network entity and to terminate a connection between the UE and the source network entity.

Aspect 5: The method of any of Aspects 1 through 4, wherein performing the action related to the conditional handover based at least in part on the condition being satisfied further comprises: determining that the second subscription has a handover or a reestablishment to another serving band that is compatible with the target band associated with the target network entity; and performing, via the first subscription and based at least in part on the trigger event, the conditional handover to establish a connection between the UE and the target network entity and to terminate a connection between the UE and the source network entity.

Aspect 6: The method of any of Aspects 1 through 5, wherein the trigger event is a first trigger event, the target band is a first target band, and the conditional handover is a first conditional handover, and wherein performing the action related to the conditional handover based at least in part on the condition being satisfied further comprises: determining, via the first subscription, a second trigger event associated with a second target band that is compatible with the serving band associated with the second subscription; dropping the first trigger event for the first conditional handover from the buffer; and performing, via the first subscription and based at least in part on the second trigger event, a second conditional handover to establish a connection between the UE and the target network entity and to terminate a connection between the UE and the source network entity.

Aspect 7: The method of any of Aspects 1 through 6, wherein performing the action related to the conditional handover based at least in part on the condition being satisfied further comprises: detecting a radio link failure (RLF) associated with the first subscription; and dropping the trigger event for the conditional handover from the buffer based at least in part on the RLF associated with the first subscription.

Aspect 8: The method of any of Aspects 1 through 7, wherein performing the action related to the conditional handover based at least in part on the condition being satisfied further comprises: determining that a duration of time associated with the trigger event for the conditional handover being stored in the buffer satisfies a threshold; and dropping the trigger event for the conditional handover from the buffer based at least in part on the duration of time satisfying the threshold.

Aspect 9: The method of any of Aspects 1 through 8, wherein performing the action related to the conditional handover based at least in part on the condition being satisfied further comprises: determining that the trigger event no longer satisfies the trigger event criteria; and dropping the trigger event for the conditional handover from the buffer based at least in part on the trigger event no longer satisfying the trigger event criteria.

Aspect 10: The method of any of Aspects 1 through 9, further comprising: storing multiple trigger events including the trigger event in the buffer; and removing the trigger event from the multiple trigger events based at least in part on an age associated with the trigger event or a measurement value associated with the trigger event in relation to other measurement values associated with other trigger events of the multiple trigger events.

Aspect 11: The method of any of Aspects 1 through 10, wherein the first subscription is associated with one or more trigger events for conditional handovers and the second subscription is associated with one or more trigger events for conditional handovers, and wherein the one or more trigger events associated with the first subscription and the one or more trigger events associated with the second subscription occur during a same time window.

Aspect 12: A method of wireless communication performed by a user equipment (UE), comprising: determining, via a first subscription of the UE, a trigger event for a conditional handover of the UE from a source network entity to a target network entity based at least in part on trigger event criteria being satisfied; determining that a target band associated with the target network entity is compatible with a serving band associated with a second subscription of the UE; and performing, via the first subscription, the conditional handover to establish a connection between the UE and the target network entity and to terminate a connection between the UE and the source network entity.

Aspect 13: The method of Aspect 12, wherein determining that the target band associated with the target network entity is compatible with the serving band associated with the second subscription is based at least in part on accessing a table of band combinations.

Aspect 14: The method of any of Aspects 12 through 13, wherein the target band associated with the target network entity and the serving band associated with the second subscription are dual subscriber identification module (SIM) dual-active (DSDA)-compatible bands that allow the first subscription and the second subscription to operate in a DSDA mode.

Aspect 15: The method of any of Aspects 12 through 14, wherein performing the conditional handover comprises: transmitting, via the first subscription to the target network entity, a random access channel preamble; and receiving, via the first subscription from the target network entity, a random access response.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        determine, via a first subscription of the UE, a trigger event for a conditional handover of the UE from a source network entity to a target network entity based at least in part on trigger event criteria being satisfied;
        delay the conditional handover based at least in part on the trigger event and based at least in part on a target band associated with the target network entity being not compatible with a serving band associated with a second subscription of the UE; and
        perform an action related to the conditional handover based at least in part on a condition being satisfied.

2. The apparatus of claim 1, wherein the one or more processors are configured to determine that the target band associated with the target network entity is not compatible with the serving band associated with the second subscription based at least in part on accessing a table of band combinations.

3. The apparatus of claim 1, wherein the target band associated with the target network entity and the serving band associated with the second subscription are non-dual-subscriber identification module (SIM) dual-active (DSDA)-compatible bands that prevent the first subscription and the second subscription from operating in a DSDA mode.

4. The apparatus of claim 1, wherein the one or more processors, to perform the action related to the conditional handover based at least in part on the condition being satisfied, are configured to:
    determine that a connection associated with the second subscription has been released; and
    perform, via the first subscription and based at least in part on the trigger event, the conditional handover to establish a connection between the UE and the target network entity and to terminate a connection between the UE and the source network entity.

5. The apparatus of claim 1, wherein the one or more processors, to perform the action related to the conditional handover based at least in part on the condition being satisfied, are configured to:

determine that the second subscription has a handover or a reestablishment to another serving band that is compatible with the target band associated with the target network entity; and perform, via the first subscription and based at least in part on the trigger event, the conditional handover to establish a connection between the UE and the target network entity and to terminate a connection between the UE and the source network entity.

6. The apparatus of claim 1, wherein the trigger event is a first trigger event, the target band is a first target band, and the conditional handover is a first conditional handover, and wherein the one or more processors, to perform the action related to the conditional handover based at least in part on the condition being satisfied, are configured to:

determine, via the first subscription, a second trigger event associated with a second target band that is compatible with the serving band associated with the second subscription;

drop the first trigger event for the first conditional handover from a buffer; and perform, via the first subscription and based at least in part on the second trigger event, a second conditional handover to establish a connection between the UE and the target network entity and to terminate a connection between the UE and the source network entity.

7. The apparatus of claim 1, wherein the one or more processors, to perform the action related to the conditional handover based at least in part on the condition being satisfied, are configured to:

detect a radio link failure (RLF) associated with the first subscription; and drop the trigger event for the conditional handover from a buffer based at least in part on the RLF associated with the first subscription.

8. The apparatus of claim 1, wherein the one or more processors, to perform the action related to the conditional handover based at least in part on the condition being satisfied, are configured to:

determine that a duration of time associated with the trigger event for the conditional handover being stored in a buffer satisfies a threshold; and drop the trigger event for the conditional handover from the buffer based at least in part on the duration of time satisfying the threshold.

9. The apparatus of claim 1, wherein the one or more processors, to perform the action related to the conditional handover based at least in part on the condition being satisfied, are configured to:

determine that the trigger event no longer satisfies the trigger event criteria; and drop the trigger event for the conditional handover from a buffer based at least in part on the trigger event no longer satisfying the trigger event criteria.

10. The apparatus of claim 1, wherein the one or more processors are further configured to:

store multiple trigger events including the trigger event in a buffer; and remove the trigger event from the multiple trigger events based at least in part on an age associated with the trigger event or a measurement value associated with the trigger event in relation to other measurement values associated with other trigger events of the multiple trigger events.

11. The apparatus of claim 1, wherein the first subscription is associated with one or more trigger events for conditional handovers and the second subscription is associated with one or more trigger events for conditional handovers, and wherein the one or more trigger events associated with the first subscription and the one or more trigger events associated with the second subscription occur during a same time window.

12. The apparatus of claim 1, wherein the one or more processors, to delay the conditional handover, are configured to:

store the trigger event for the conditional handover in a buffer of the UE based at least in part on the target band associated with the target network entity being not compatible with the serving band associated with the second subscription of the UE.

13. The apparatus of claim 1, wherein the condition comprises the target band associated with the target network entity being compatible with the serving band associated with the second subscription of the UE.

14. An apparatus for wireless communication at a user equipment (UE), comprising:

a memory; and one or more processors, coupled to the memory, configured to:

determine, via a first subscription of the UE, a trigger event for a conditional handover of the UE from a source network entity to a target network entity based at least in part on trigger event criteria being satisfied;

determine that a target band associated with the target network entity is compatible with a serving band associated with a second subscription of the UE; and perform, via the first subscription, the conditional handover to establish a connection between the UE and the target network entity and to terminate a connection between the UE and the source network entity.

15. The apparatus of claim 14, wherein the one or more processors are configured to determine that the target band associated with the target network entity is not compatible with the serving band associated with the second subscription based at least in part on accessing a table of band combinations.

16. The apparatus of claim 14, wherein the target band associated with the target network entity and the serving band associated with the second subscription are dual subscriber identification module (SIM) dual-active (DSDA)-compatible bands that allow the first subscription and the second subscription to operate in a DSDA mode.

17. The apparatus of claim 14, wherein the one or more processors, to perform the conditional handover, are configured to:

transmit, via the first subscription to the target network entity, a random access channel preamble; and receive, via the first subscription from the target network entity, a random access response.

18. A method of wireless communication performed by a user equipment (UE), comprising:

determining, via a first subscription of the UE, a trigger event for a conditional handover of the UE from a source network entity to a target network entity based at least in part on trigger event criteria being satisfied;

delaying the conditional handover based at least in part on the trigger event and based at least in part on a target band associated with the target network entity being not compatible with a serving band associated with a second subscription of the UE; and performing an action related to the conditional handover based at least in part on a condition being satisfied.

19. The method of claim 18, wherein determining that the target band associated with the target network entity is not compatible with the serving band associated with the second subscription is based at least in part on accessing a table of band combinations.

20. The method of claim 18, wherein the target band associated with the target network entity and the serving band associated with the second subscription are non-dual-subscriber identification module (SIM) dual-active (DSDA)-compatible bands that prevent the first subscription and the second subscription from operating in a DSDA mode.

21. The method of claim 18, wherein performing the action related to the conditional handover based at least in part on the condition being satisfied further comprises:
determining that a connection associated with the second subscription has been released; and
performing, via the first subscription and based at least in part on the trigger event, the conditional handover to establish a connection between the UE and the target network entity and to terminate a connection between the UE and the source network entity.

22. The method of claim 18, wherein performing the action related to the conditional handover based at least in part on the condition being satisfied further comprises:
determining that the second subscription has a handover or a reestablishment to another serving band that is compatible with the target band associated with the target network entity; and
performing, via the first subscription and based at least in part on the trigger event, the conditional handover to establish a connection between the UE and the target network entity and to terminate a connection between the UE and the source network entity.

23. The method of claim 18, wherein the trigger event is a first trigger event, the target band is a first target band, and the conditional handover is a first conditional handover, and wherein performing the action related to the conditional handover based at least in part on the condition being satisfied further comprises:
determining, via the first subscription, a second trigger event associated with a second target band that is compatible with the serving band associated with the second subscription;
dropping the first trigger event for the first conditional handover from a buffer; and
performing, via the first subscription and based at least in part on the second trigger event, a second conditional handover to establish a connection between the UE and the target network entity and to terminate a connection between the UE and the source network entity.

24. The method of claim 18, wherein performing the action related to the conditional handover based at least in part on the condition being satisfied further comprises:
detecting a radio link failure (RLF) associated with the first subscription; and
dropping the trigger event for the conditional handover from a buffer based at least in part on the RLF associated with the first subscription.

25. The method of claim 18, wherein performing the action related to the conditional handover based at least in part on the condition being satisfied further comprises:
determining that a duration of time associated with the trigger event for the conditional handover being stored in a buffer satisfies a threshold; and
dropping the trigger event for the conditional handover from the buffer based at least in part on the duration of time satisfying the threshold.

26. The method of claim 18, wherein performing the action related to the conditional handover based at least in part on the condition being satisfied further comprises:
determining that the trigger event no longer satisfies the trigger event criteria; and
dropping the trigger event for the conditional handover from a buffer based at least in part on the trigger event no longer satisfying the trigger event criteria.

27. The method of claim 18, further comprising:
storing multiple trigger events including the trigger event in a buffer; and
removing the trigger event from the multiple trigger events based at least in part on an age associated with the trigger event or a measurement value associated with the trigger event in relation to other measurement values associated with other trigger events of the multiple trigger events.

28. The method of claim 18, wherein the first subscription is associated with one or more trigger events for conditional handovers and the second subscription is associated with one or more trigger events for conditional handovers, and wherein the one or more trigger events associated with the first subscription and the one or more trigger events associated with the second subscription occur during a same time window.

29. A method of wireless communication performed by a user equipment (UE), comprising:
determining, via a first subscription of the UE, a trigger event for a conditional handover of the UE from a source network entity to a target network entity based at least in part on trigger event criteria being satisfied;
determining that a target band associated with the target network entity is compatible with a serving band associated with a second subscription of the UE; and
performing, via the first subscription, the conditional handover to establish a connection between the UE and the target network entity and to terminate a connection between the UE and the source network entity.

30. The method of claim 29, wherein performing the conditional handover comprises:
transmitting, via the first subscription to the target network entity, a random access channel preamble; and
receiving, via the first subscription from the target network entity, a random access response.

* * * * *